(12) United States Patent
Ross et al.

(10) Patent No.: US 11,041,380 B2
(45) Date of Patent: Jun. 22, 2021

(54) METHOD OF PRESSURE TESTING

(71) Applicant: METROL TECHNOLOGY LIMITED, Aberdeen (GB)

(72) Inventors: Shaun Compton Ross, Aberdeen (GB); Leslie David Jarvis, Stonehaven (GB)

(73) Assignee: METROL TECHNOLOGY LIMITED, Aberdeen (GB)

(*) Notice: Subject to any disclaimer, the term of this patent is extended or adjusted under 35 U.S.C. 154(b) by 401 days.

(21) Appl. No.: 16/302,657

(22) PCT Filed: May 26, 2017

(86) PCT No.: PCT/GB2017/051521
§ 371 (c)(1),
(2) Date: Nov. 18, 2018

(87) PCT Pub. No.: WO2017/203291
PCT Pub. Date: Nov. 30, 2017

(65) Prior Publication Data
US 2019/0128113 A1 May 2, 2019

(30) Foreign Application Priority Data
May 26, 2016 (GB) ..................... 1609289

(51) Int. Cl.
*E21B 47/06* (2012.01)
*E21B 47/12* (2012.01)
(Continued)

(52) U.S. Cl.
CPC ............ *E21B 47/06* (2013.01); *E21B 47/117* (2020.05); *E21B 47/12* (2013.01); *E21B 47/13* (2020.05);
(Continued)

(58) Field of Classification Search
CPC ........ E21B 47/117; E21B 47/16; E21B 47/13; E21B 47/06; G01V 1/44; G01V 3/30
See application file for complete search history.

(56) References Cited

U.S. PATENT DOCUMENTS 2,619,180 A 11/1952 Smith et al.
3,020,961 A 2/1962 Orr
(Continued)

FOREIGN PATENT DOCUMENTS

CN 203531888 4/2014
DE 102010014415 12/2010
(Continued)

OTHER PUBLICATIONS

Ken Cooper et al., "An Introduction to Mechanical Integrity Testing With a Focus on Class I Disposal Wells in Kansas", KDHE Geology & Well Technology Section 2017 Fall Seminar and Tech Fair, Aug. 30, 2017 (Year: 2017).*
(Continued)

*Primary Examiner* — Regis J Betsch
(74) *Attorney, Agent, or Firm* — Womble Bond Dickinson (US) LLP

(57) ABSTRACT

A method of pressure testing a casing system (12) comprising deploying an apparatus (110) with a container (68) formed from drill pipe or production tubing, on a string of drill pipe or production tubing into a well, such that a port (61) thereof is provided in an isolated section of the well. The isolated section of the well has a higher pressure than the pressure of a gas sealed in the container (68). The port (61) is opened and pressure in the isolated section is monitored to assess its integrity. Communication with the apparatus is achieved by wireless means sending pressure data, control signals for controlling the port and/or other data or commands.

21 Claims, 5 Drawing Sheets

(51) Int. Cl.
*E21B 47/13* (2012.01)
*E21B 47/117* (2012.01)
*E21B 47/16* (2006.01)
*G01V 1/44* (2006.01)
*G01V 3/30* (2006.01)

(52) U.S. Cl.
CPC ............ *E21B 47/16* (2013.01); *G01V 1/44* (2013.01); *G01V 3/30* (2013.01)

(56) References Cited

U.S. PATENT DOCUMENTS

| | | | |
|---|---|---|---|
| 5,394,141 | A | 2/1995 | Soulier |
| 5,576,703 | A | 11/1996 | MacLeod et al. |
| 6,173,772 | B1 | 1/2001 | Vaynshteyn |
| 6,357,525 | B1 | 3/2002 | Langseth et al. |
| 6,494,616 | B1 | 12/2002 | Tokhtuev et al. |
| 8,215,164 | B1 | 7/2012 | Hussain et al. |
| 2002/0020535 | A1 | 2/2002 | Johnson et al. |
| 2002/0066563 | A1 | 6/2002 | Langseth et al. |
| 2003/0056952 | A1 | 3/2003 | Stegemeier et al. |
| 2004/0104029 | A1 | 6/2004 | Martin |
| 2005/0077086 | A1 | 4/2005 | Vise |
| 2006/0225881 | A1 | 10/2006 | O'Shaughnessy et al. |
| 2007/0162235 | A1 | 7/2007 | Zhan et al. |
| 2007/0236215 | A1 | 10/2007 | Innes et al. |
| 2008/0066536 | A1 | 3/2008 | Goodwin et al. |
| 2008/0156482 | A1 | 7/2008 | Gubar et al. |
| 2009/0229813 | A1 | 9/2009 | Brink et al. |
| 2011/0158050 | A1 | 6/2011 | Merino et al. |
| 2011/0174487 | A1 | 7/2011 | Burleson et al. |
| 2011/0303409 | A1 | 12/2011 | Harrigan et al. |
| 2012/0085540 | A1 | 4/2012 | Heijnen |
| 2013/0075109 | A1 | 3/2013 | Frisby et al. |
| 2013/0111985 | A1 | 5/2013 | Veeningen |
| 2013/0133883 | A1 | 5/2013 | Hill |
| 2013/0299165 | A1 | 11/2013 | Crow |
| 2014/0041873 | A1 | 2/2014 | Lovik |
| 2014/0311736 | A1 | 10/2014 | Pipchuk et al. |
| 2015/0159480 | A1* | 6/2015 | Kalyanaraman ........ E21B 47/06 166/250.01 |
| 2015/0233773 | A1 | 8/2015 | Sale et al. |
| 2015/0292288 | A1 | 10/2015 | Kasperski et al. |
| 2015/0315895 | A1 | 11/2015 | Patel et al. |
| 2016/0123133 | A1 | 5/2016 | Leeflang et al. |

FOREIGN PATENT DOCUMENTS

| | | |
|---|---|---|
| EP | 2192262 | 6/2010 |
| EP | 2886790 | 6/2015 |
| GB | 2522272 | 7/2015 |
| WO | 200301169 | 1/2003 |
| WO | 2003098176 | 11/2003 |
| WO | 2014022384 | 2/2014 |
| WO | 2014120988 | 8/2014 |
| WO | 2017203285 | 11/2017 |
| WO | 2017203286 | 11/2017 |
| WO | 2017203287 | 11/2017 |
| WO | 2017203288 | 11/2017 |
| WO | 2017203290 | 11/2017 |
| WO | 2017203292 | 11/2017 |
| WO | 2017203293 | 11/2017 |
| WO | 2017203294 | 11/2017 |
| WO | 2017203295 | 11/2017 |
| WO | 2017203296 | 11/2017 |

OTHER PUBLICATIONS

Hawkes et al, "Pressure transient testing for assessment of wellbore integrity in the IEAGHG Weyburn-Midale CO2 Monitoring and Storage Project", International Journal of Greenhouse Gas Control 16S (2013) S50-S61 (Year: 2013).*
Pennsylvania Doe, "Instructions for Evaluating Mechanical Integrity of Operating Oil and Gas Wells", Form 5500-PM-OGXXXX Rev. 1/2011 (Year: 2011).*
Examination Report for Corresponding Eurasian Application No. 201892744, dated Mar. 23, 2020.
International Search Report for PCT/GB2017/051521, dated Jul. 20, 2017.
Schlumberger: "WellWatcher Flux, Multizonal reservoir monitoring system", 2016.
Copending International Application No. PCT/GB2017/051515 filed May 26, 2017.
Copending International Application No. PCT/GB2017/051516 filed May 26, 2017.
Copending International Application No. PCT/GB2017/051517 filed May 26, 2017.
Copending International Application No. PCT/GB2017/051518 filed May 26, 2017.
Copending International Application No. PCT/GB2017/051520 filed May 26, 2017.
Copending International Application No. PCT/GB2017/051522 filed May 26, 2017.
Copending International Application No. PCT/GB2017/051523 filed May 26, 2017.
Copending International Application No. PCT/GB2017/051524 filed May 26, 2017.
Copending International Application No. PCT/GB2017/051525 filed May 26, 2017.
Copending International Application No. PCT/GB2017/051526 filed May 26, 2017.
International Preliminary Report on Patentability for PCT/GB2017/051521, dated Apr. 24, 2018.
UKIPO Search Report dated Nov. 30, 2016 in corresponding GB Application No. GB1609289.2.
Examination Report for Corresponding Eurasian Application No. 201892744, dated Oct. 9, 2020.

* cited by examiner

METHOD OF PRESSURE TESTING

CROSS REFERENCE TO RELATED APPLICATIONS

This application is a 35 U.S.C. 371 National Stage of International Application No. PCT/GB2017/051521, titled "METHOD OF PRESSURE TESTING", filed May 26, 2017, which claims priority to GB Application No. 1609289.2, titled "METHOD OF PRESSURE TESTING", filed May 26, 2016, all of which are incorporated by reference herein in their entirety.

The present invention relates to a method of pressure testing a casing, particularly including a casing hanger.

After drilling, casing strings are normally run into the well and cemented in place to help maintain well stability. The casing acts as a barrier between the subsurface formations and the wellbore, and as such helps to prevent the uncontrolled flow of fluids into the well. In some cases, the casing may be damaged during installation, or the integrity of the casing may become compromised over time, which can result in the casing failing, and uncontrolled leaking of hydrocarbons.

It is therefore necessary, especially before producing any hydrocarbons, to carry out tests in the well to check for leaks in the casing and associated casing hanger. This may be done by way of an inflow test, a negative pressure test or a negative differential pressure test.

This may involve circulating a lighter fluid, such as seawater, into the well above an isolated section, to displace the heavier fluid, such as mud, already present in the well, and consequently reducing the hydrostatic head, or pressure, on the isolated section. This lighter hydrostatic head would induce flow from any leaks in the casing. The well is then monitored for such flow.

Alternatively, the well is shut in and the reduced pressure in the isolated section is monitored, and if the reduced pressure is maintained over a period of time, this implies that the casing is intact. If however, the pressure recovers, i.e. the pressure increases again, then this is indicative of a leak in the casing and/or casing hanger. The integrity of casing hangers are in particular assessed in such a manner.

Circulating light fluids in a large portion of the well is a time consuming process and requires large volumes of fluid. Moreover, the well is controlled primarily by the hydrostatic head of the fluid in the well. Therefore removing this control from the well is hazardous if a major leak is present, as this could lead to loss of well control and potentially result in a blowout.

The inventors of the present invention have recognised the above limitations with the current methods and have devised a new method which aims to at least mitigate one or more problems of the known procedures.

According to a first aspect of the present invention, there is provided a method of pressure testing a casing system of a well system, the method comprising:
  providing an apparatus comprising a communication device, and a container with a volume of at least twenty litres (l), the container having a port to allow for fluid communication between an inside and an outside of the container;
  closing the port such that the inside of the container has a container pressure;
  deploying the apparatus into the well system on one of production tubing and drill pipe;
  isolating a section of the well system to provide an isolated section, the isolated section including the port of the container; the isolated section, outside of the container, having an isolated section pressure which is higher than the container pressure;
  reducing the pressure in the isolated section outside of the container, by opening the port to allow fluid communication between the inside of the container and an outside of the container; and,
  whilst maintaining isolation of the isolated section, monitor the pressure in the isolated section;
  using the monitored pressure to assess the integrity of the isolated section;
  communicating between the communication device in the isolated section and above the isolated section by using, at least in part, a wireless signal transmitted in at least one of the following forms: electromagnetic, acoustic, inductively coupled tubulars and coded pressure pulsing;
  wherein the wireless signal comprises at least one of (i) pressure data and (ii) control signals for controlling fluid flow through the port.

Embodiments of the present invention can therefore conveniently utilise conventional drill pipe or production tubing to convey the apparatus on such drill pipe or production tubing into the well system and conduct a negative pressure test. This obviates the need to provide and circulate a lighter fluid into the well, and can thus save cost and time. It also maintains the hydrostatic head of the original fluid to enhance well safety.

Moreover, the isolated section can provide containment means in the well, so that in the event of a failure of integrity of the casing and an influx of fluid into the well, control is maintained and the influx is not able to progress up the well.

A casing system includes casing, casing hanger(s) and/or a casing shoe.

Embodiments of the invention can therefore determine if there is a leak in the isolated section of the well. Thus it can be inferred if the integrity of the isolated section, for example a casing hanger or casing shoe, is or is not sealing, as it should, by monitoring the pressure. The test may be applied to a section of casing or casing hanger/shoe only, or to a casing section including a casing hanger or casing shoe. Even in the latter case the test effectively can focus on the casing hanger or shoe even though a small section of casing is tested too; or it may test the casing string and the hanger together. The isolated section may include a casing collar.

References to casing and casing hangers includes liner and liner hangers unless stated otherwise. The hangers may be at the top of the well system or within the well system.

The container may be formed from at least one of drill pipe and production tubing. This allows the container to have larger volumes, and such tubulars are generally readily available. Thus whilst the production tubing or drill string used to deploy the apparatus may also form the container, normally many more joints are required to deploy the apparatus than are required to form the container, and so typically for such embodiments not all of the production tubing or drill string deployed forms the container.

Production tubing is conventionally used for well completions, through which hydrocarbons may be produced, though notably the present invention is concerned with pressure testing a casing system rather than production of hydrocarbons.

Typical production tubing and drill pipe comprise joints of 3 m to 14 m, generally 8 m to 12 m, and nominal external diameters from 2⅜" to 7" (60 mm-178 mm), optionally 2⅞" (73 mm) nominal diameter and optionally at most 7" diameter (178 mm) and this is used to deploy the apparatus into the well and some joints such as 1, 2, 3 or more may be used together to form the container.

Even when the container is formed from production tubing or drill pipe, other components may also be present and partly form the container, such as a valve, a sub or pup joint.

Similarly whilst the apparatus is deployed on production tubing or drill pipe, especially at least five joints thereof, other components may also be present such as drill collars, valves and bridge plugs.

After the pressure in the isolated section is reduced by opening the port, in the event of a failure of integrity of the casing, the drill pipe or production tubing used to deploy the apparatus provides a facility to pump and/or circulate fluids into the well to control the fluid influx.

Optionally therefore, the production tubing or drill pipe comprises a valve, typically a circulating valve, allowing or resisting fluid passage between a central bore therein and the isolated section. Alternatively or additionally a valve, typically a circulating valve, may be provided between a central bore of the production tubing or drill pipe and a section of the well above the isolated section. These valves provide means to circulate fluid within the well, and/or pump fluid into the previously isolated section, optionally whilst maintaining isolation within the casing to tubing annulus.

Said valves may be wirelessly controllable, especially by electromagnetic or acoustic wireless control.

A pressure sensor is normally provided. This may be in the isolated section or outside the isolated section but ported thereto, or indeed otherwise configured in order to measure pressure in the isolated section.

The temperature in the isolated section may be monitored by a suitable temperature sensor in the isolated section or outside the isolated section and configured to monitor temperature in the isolated section. This temperature may be taken into account when assessing the integrity of the isolated section. For example pressure may drop when fluid which has been circulated from a lower/warmer area of the well to a higher/cooler area of the well remains there for a period of time and cools. Monitoring the temperature can assist in correctly interpreting the data from the pressure sensor.

Similarly when fluid communication between the inside of the container and the outside of the container is allowed, the drop in pressure will cause the well to cool slightly. The temperature will then recover and pressure will rise as the temperature recovers. This can be taken into account when assessing the integrity of the well.

Thus thermal affects in the isolated section can be modelled using the well-known inter-relationship between pressure, temperature and volume to more accurately assess the integrity of the well.

The container volume may be from 0.05-10% of the volume of the isolated section. Optionally, the container volume is 0.2-3% of the volume of the isolated section. Thus the size of the container varies depending on the well system, and in particular the volume of the isolated section. The container may have a volume of at least 100 l or at least 200 l. The container may have a volume of up to 5000 l, optionally at most 3000 l and optionally at most 2000 l. For certain embodiments, the container may be made from a plurality of adjoined drill pipe or production tubing sections.

The container may extend in length for at least 10 metres(m), optionally at least 25 m or at least 50 m in length.

In further embodiments the container may extend to the surface of the well system, and may be open-ended at the surface.

The drill pipe or production tubing may also house other components of the apparatus.

Prior to opening the port, the container may comprise at least 50 vol % gas optionally at least 90 vol % gas.

The inside of the container may have an atmospheric pressure and when in the isolated section will then have a lower pressure than the isolated section (since wells are naturally at an elevated pressure). Alternatively, the container may be evacuated at surface. Therefore it may have a pressure, prior to opening the port, of less than 25 psi. In either case it is normally provided with the container pressure and the port closed before being deployed into the well system and subsequently into the isolated section.

The drawdown caused by allowing the container to communicate with said outside of the container in the isolated section may be at least 250 psi, or more than 500 psi or more than 1000 psi.

The depth at which the container is opened may be at least 200 m, optionally at least 400 m below the top of the well system's hydrostatic head. In a subsea well therefore, this includes the fluid column in a riser.

Port

The port could be opened, optionally in response to said wireless signal, by a control mechanism which may comprise a rupture disk, a valve and/or a pump; normally a valve. The rupture disk could be activated by a needle mechanism. Optionally the valve is at the port such that a valve member of the valve can directly obstruct and resist fluid flow through the port.

A choke may be provided, optionally at the port, to control the rate of pressure drop.

The port is normally subsequently closed, optionally by a separate signal. The port may be closed before pressure inside and outside of the container has equalised, and then opened again later.

The valve may be a piston, needle, ball or sleeve valve.

The valve may be a pressure release valve (optionally controllable) which will allow flow therepast above a certain pressure, and will close if the pressure is or drops below a threshold or "trip point". In one embodiment the valve can be controlled to allow flow therepast above 3000 psi and will close if the pressure is or drops below this 3000 psi threshold. Optionally, the threshold at which the valve closes may be variable wirelessly in situ by a user for example to 4000 psi. The threshold/trip point may be varied depending on a parameter detected within the isolated section or within the container. Therefore, a feedback loop may be provided in the well.

The pressure release valve may have a mechanism to disengage the pressure release functionality and provide fixed open/close positions; or may be combined with a further valve to provide such fixed open/close options for the port.

Isolated Section

The isolated section may be the entire well. Alternatively, the length of the isolated section may be up to 2000 m, up to 1000 m or 500 m or much smaller if the primary motivation is to test a hanger or a small section of casing. For example under 100 m or less than 50 m or less than 10 m.

The 'bottom of the isolated section' is the lowermost extent of the isolated section be it in the bore of a casing or tubular within a casing, or in an annulus.

The bottom (or near the bottom) of the isolated section may be defined by a casing shoe, valve, blank sub or an annular sealing device such as a packer or plug for example bridge plug, or the apparatus.

The bottom of the isolated section may be defined by annular sealing device such as a temporary packer which is removed along with the apparatus after the port has opened. Thus the method may include moving the apparatus towards the surface of the well for recovery along with said temporary packer which previously defined the bottom of the isolated section's that is its lower extent.

The 'top of the isolated section' is the uppermost extent of the isolated section be it in the bore of a casing or tubular within a casing, or in an annulus.

A top (or near the top) of the isolated section may be defined by BOP rams (for a subsea well), lines (for example flowlines, choke and kill lines) connected to a BOP, valves of a lower marine riser package, or a wellhead up to a barrier for example closed valve therein. It may alternatively be defined by a valve, blank sub, diverter or an annular sealing device such as a packer or plug for example bridge plug or the apparatus. The top of the isolated section may include a Lower Marine Riser Package which includes valves which can isolate the isolated section.

Part of the isolated section may be defined by a casing tubular.

Deployment

For certain embodiments, the isolated section of the well is defined, in part, by the apparatus or said conveyance means. A plug, or blank or valve within the conveyance means may also define, in part, the isolated section.

The container is deployed such that the port is in the isolated section.

A plurality of apparatus may be provided on the same conveyance means. Each of the plurality of apparatus may be provided in the same or separate isolated sections. Thus there may be a plurality of isolated sections, each having an apparatus therein. More than one isolated section can thus be tested on the same run and indeed simultaneously.

The conveyance means and apparatus may be configured such that in use, a flow bypass is provided past the apparatus within the conveyance means.

For certain embodiments, the apparatus may be deployed in a central bore of a pre-existing tubular in the well, rather than into a pre-existing annulus in the well. An annulus may be defined between the apparatus and the pre-existing tubular in the well.

Annular Sealing Device

An annular sealing device may or may not be present in the well.

An annular sealing device, defining the top and or bottom of the isolated section may include, independently, a wiper or cup seal.

The annular sealing device is a device which seals between two tubulars (or a tubular and the wellbore), such as a packer element or a polished bore and seal assembly.

The packer element may be part of a packer, bridge plug, or liner hanger, especially a packer or bridge plug.

A packer includes a packer element along with a packer upper tubular and a packer lower tubular along with a body on which the packer element is mounted.

The packer can be permanent or temporary. Temporary packers are normally retrievable and are run with a string and so removed with the string. Permanent packers on the other hand, are normally designed to be left in the well (though they could be removed at a later time).

The annular sealing device may be wirelessly controlled.

A sealing portion of the annular sealing device may be elastomeric, non-elastomeric and/or metallic.

For certain embodiments, if a leak is found or suspected, the method may be repeated focusing on a smaller isolated section in order to attempt to more precisely locate the leak. This may be without removing the apparatus from the well after the original or previous isolated section was monitored (i.e. in the same trip), for example, by deflating and/or unseating a packer and resetting it at a different depth. Or it may be done by deploying apparatus in a separate trip. Normally the smaller isolated section is a subset of the original isolated section.

The apparatus may be elongate in shape. The apparatus is often provided in the form of a pipe. It is normally cylindrical in shape.

The container may comprise a drain valve. For example this may be provided spaced away from the mechanical valve assembly to allow fluid therein to drain more readily when the apparatus is returning to surface.

Wireless

The communication between the communication device in the isolated section and above the isolated section is normally entirely using said wireless signal. For such embodiments, transmission within the isolated section may also use other signals (for example wired) and transmission within an area outwith the isolated section may also use other signals (for example wired).

The communication device may be configured to receive the communication in the form of a wireless control signal from above the isolated section for allowing or resisting fluid communication between the inside of the container and the outside of the container, for example by controlling a valve at the port.

Thus, communication between the isolated section and above the isolated section may include control signals to activate the apparatus to allow fluid communication between the inside of the container and the outside of the container via the port.

Alternatively or additionally, said communication may comprise data from a sensor, such as the pressure sensor, from the isolated section to above the isolated section.

SIGNALS

Communication between the communication device in the isolated section and above the isolated section may be in part at least, in at least one of the following forms: electromagnetic, acoustic, inductively coupled tubulars and coded pressure pulsing and references herein to "wireless", relate to said forms, unless where stated otherwise.

The signals may be data or control signals and need not be in the same wireless form. Accordingly, the options set out herein for different types of wireless signals are independently applicable to data and control signals. The control signals can control downhole devices including sensors. Data from sensors may be transmitted in response to a control signal. Moreover data acquisition and/or transmission parameters, such as acquisition and/or transmission rate or resolution, may be varied using suitable control signals.

The communication device may comprise a wireless communication device. In alternative embodiments, the communication device is a wired communication device and the wireless signal transmitted in other parts of the well.

Coded Pressure Pulses

Pressure pulses include methods of communicating from/to within the well/borehole, from/to at least one of a further location within the well/borehole, and the surface of the well/borehole, using positive and/or negative pressure changes, and/or flow rate changes of a fluid in a tubular and/or annular space.

Coded pressure pulses are such pressure pulses where a modulation scheme has been used to encode commands and/or data within the pressure or flow rate variations and a transducer is used within the well/borehole to detect and/or generate the variations, and/or an electronic system is used within the well/borehole to encode and/or decode commands and/or the data. Therefore, pressure pulses used with an in-well/borehole electronic interface are herein defined as coded pressure pulses. An advantage of coded pressure pulses, as defined herein, is that they can be sent to electronic interfaces and may provide greater data rate and/or bandwidth than pressure pulses sent to mechanical interfaces.

Where coded pressure pulses are used to transmit control signals, various modulation schemes may be used to encode control signals such as a pressure change or rate of pressure change, on/off keyed (OOK), pulse position modulation (PPM), pulse width modulation (PWM), frequency shift keying (FSK), pressure shift keying (PSK), amplitude shift keying (ASK), combinations of modulation schemes may also be used, for example, OOK-PPM-PWM. Data rates for coded pressure modulation schemes are generally low, typically less than 10 bps, and may be less than 0.1 bps.

Coded pressure pulses can be induced in static or flowing fluids and may be detected by directly or indirectly measuring changes in pressure and/or flow rate. Fluids include liquids, gasses and multiphase fluids, and may be static control fluids, and/or fluids being produced from or injected in to the well.

Signals—General

Preferably the wireless signals are such that they are capable of passing through a barrier, such as a plug, or the top or bottom of the isolated section. Preferably therefore the wireless signals are transmitted in at least one of the following forms: electromagnetic, acoustic, and inductively coupled tubulars.

EM/Acoustic and coded pressure pulsing use the well, borehole or formation as the medium of transmission. The EM/acoustic or pressure signal may be sent from the well, or from the surface. If provided in the well, an EM/acoustic signal can travel through any device defining the top or bottom of the isolated section, although for certain embodiments, it may travel indirectly, for example around such a device.

Electromagnetic and acoustic signals are especially preferred—they can transmit through/past an annular barrier without special inductively coupled tubulars infrastructure, and for data transmission, the amount of information that can be transmitted is normally higher compared to coded pressure pulsing, especially receiving data from the well.

Therefore, the communication device may comprise an acoustic communication device and the wireless control signal comprises an acoustic control signal and/or the communication device may comprise an electromagnetic communication device and the wireless control signal comprises an electromagnetic control signal.

Similarly the transmitters and receivers used correspond with the type of wireless signals used. For example an acoustic transmitter and receiver are used if acoustic signals are used.

Where inductively coupled tubulars are used, there are normally at least ten, usually many more, individual lengths of inductively coupled tubular which are joined together in use, to form a string of inductively coupled tubulars. They have an integral wire and may be formed tubulars such as tubing, drill pipe or casing. At each connection between adjacent lengths there is an inductive coupling.

The inductively coupled tubulars that may be used can be provided by N O V under the brand Intellipipe®.

Thus, the EM/acoustic or pressure wireless signals can be conveyed a relatively long distance as wireless signals, sent for at least 200 m, optionally more than 400 m or longer which is a clear benefit over other short range signals. Embodiments including inductively coupled tubulars provide this advantage/effect by the combination of the integral wire and the inductive couplings. The distance travelled may be much longer, depending on the length of the well.

Data and commands within the signal may be relayed or transmitted by other means. Thus the wireless signals could be converted to other types of wireless or wired signals, and optionally relayed, by the same or by other means, such as hydraulic, electrical and fibre optic lines. In one embodiment, the signals may be transmitted through a cable for a first distance, such as over 400 m, and then transmitted via acoustic or EM communications for a smaller distance, such as 200 m. In another embodiment they are transmitted for 500 m using coded pressure pulsing and then 1000 m using a hydraulic line.

Thus whilst non-wireless means may be used to transmit the signal in addition to the wireless means, preferred configurations preferentially use wireless communication. Thus, whilst the distance travelled by the signal is dependent on the depth of the well, often the wireless signal, including relays but not including any non-wireless transmission, travel for more than 1000 m or more than 2000 m. Preferred embodiments also have signals transferred by wireless signals (including relays but not including non-wireless means) at least half the distance from the surface of the well to the apparatus.

Different wireless signals may be used in the same well for communications going from the well towards the surface, and for communications going from the surface into the well.

Thus, the wireless signal may be sent to the communication device, directly or indirectly, for example making use of in-well relays within or outwith the isolated section. The wireless signal may be sent from the surface or from a wireline/coiled tubing (or tractor) run probe at any point in the well optionally above the isolated section. For certain embodiments, the probe may be positioned relatively close to the isolated section for example less than 30 m therefrom, or less than 15 m.

Acoustic

Acoustic signals and communication may include transmission through vibration of the structure of the well including tubulars, casing, liner, drill pipe, drill collars, tubing, coil tubing, sucker rod, downhole tools; transmission via fluid (including through gas), including transmission through fluids in uncased sections of the well, within tubulars, and within annular spaces; transmission through static or flowing fluids; mechanical transmission through wireline, slickline or coiled rod; transmission through the earth; transmission through wellhead equipment. Communication through the structure and/or through the fluid are preferred.

Acoustic transmission may be at sub-sonic (<20 Hz), sonic (20 Hz-20 kHz), and ultrasonic frequencies (20 kHz-2 MHz). Preferably the acoustic transmission is sonic (20 Hz-20 khz).

The acoustic signals and communications may include Frequency Shift Keying (FSK) and/or Phase Shift Keying (PSK) modulation methods, and/or more advanced derivatives of these methods, such as Quadrature Phase Shift Keying (QPSK) or Quadrature Amplitude Modulation (QAM), and preferably incorporating Spread Spectrum Techniques. Typically they are adapted to automatically tune acoustic signalling frequencies and methods to suit well conditions.

The acoustic signals and communications may be uni-directional or bi-directional. Piezoelectric, moving coil transducer or magnetostrictive transducers may be used to send and/or receive the signal.

EM

Electromagnetic (EM) (sometimes referred to as Quasi-Static (QS)) wireless communication is normally in the frequency bands of: (selected based on propagation characteristics)

sub-ELF (extremely low frequency) <3 Hz (normally above 0.01 Hz);
ELF 3 Hz to 30 Hz;
SLF (super low frequency) 30 Hz to 300 Hz;
ULF (ultra low frequency) 300 Hz to 3 kHz; and,
VLF (very low frequency) 3 kHz to 30 kHz.

An exception to the above frequencies is EM communication using the pipe as a wave guide, particularly, but not exclusively when the pipe is gas filled, in which case frequencies from 30 kHz to 30 GHz may typically be used dependent on the pipe size, the fluid in the pipe, and the range of communication. The fluid in the pipe is preferably non-conductive. U.S. Pat. No. 5,831,549 describes a telemetry system involving gigahertz transmission in a gas filled tubular waveguide.

Sub-ELF and/or ELF are preferred for communications from a well to the surface (for example over a distance of above 100 m). For more local communications, for example less than 10 m, VLF is preferred. The nomenclature used for these ranges is defined by the International Telecommunication Union (ITU).

EM communications may include transmitting communication by one or more of the following: imposing a modulated current on an elongate member and using the earth as return; transmitting current in one tubular and providing a return path in a second tubular; use of a second well as part of a current path; near-field or far-field transmission; creating a current loop within a portion of the well metalwork in order to create a potential difference between the metalwork and earth; use of spaced contacts to create an electric dipole transmitter; use of a toroidal transformer to impose current in the well metalwork; use of an insulating sub; a coil antenna to create a modulated time varying magnetic field for local or through formation transmission; transmission within the well casing; use of the elongate member and earth as a coaxial transmission line; use of a tubular as a wave guide; transmission outwith the well casing.

Especially useful is imposing a modulated current on an elongate member and using the earth as return; creating a current loop within a portion of the well metalwork in order to create a potential difference between the metalwork and earth; use of spaced contacts to create an electric dipole transmitter; and use of a toroidal transformer to impose current in the well metalwork.

To control and direct current advantageously, a number of different techniques may be used. For example one or more of: use of an insulating coating or spacers on well tubulars; selection of well control fluids or cements within or outwith tubulars to electrically conduct with or insulate tubulars; use of a toroid of high magnetic permeability to create inductance and hence an impedance; use of an insulated wire, cable or insulated elongate conductor for part of the transmission path or antenna; use of a tubular as a circular waveguide, using SHF (3 GHz to 30 GHz) and UHF (300 MHz to 3 GHz) frequency bands.

Suitable means for receiving the transmitted signal are also provided, these may include detection of a current flow; detection of a potential difference; use of a dipole antenna; use of a coil antenna; use of a toroidal transformer; use of a Hall effect or similar magnetic field detector; use of sections of the well metalwork as part of a dipole antenna.

Where the phrase "elongate member" is used, for the purposes of EM transmission, this could also mean any elongate electrical conductor including: liner; casing; tubing or tubular; coil tubing; sucker rod; wireline; drill pipe; slickline or coiled rod.

A means to communicate signals within a well with electrically conductive casing is disclosed in U.S. Pat. No. 5,394,141 by Soulier and U.S. Pat. No. 5,576,703 by MacLeod et al both of which are incorporated herein by reference in their entirety.

A transmitter comprising oscillator and power amplifier is connected to spaced contacts at a first location inside the finite resistivity casing to form an electric dipole due to the potential difference created by the current flowing between the contacts as a primary load for the power amplifier. This potential difference creates an electric field external to the dipole which can be detected by either a second pair of spaced contacts and amplifier at a second location due to resulting current flow in the casing or alternatively at the surface between a wellhead and an earth reference electrode.

Relay

A relay comprises a transceiver (or receiver) which can receive a signal, and an amplifier which amplifies the signal for the transceiver (or a transmitter) to transmit it onwards.

There may be at least one relay. The at least one relay (and the transceivers or transmitters associated with the apparatus or at the surface) may be operable to transmit a signal for at least 200 m through the well. One or more relays may be configured to transmit for over 300 m, or over 400 m.

For acoustic communication there may be more than five, or more than ten relays, depending on the depth of the well and the position of the apparatus.

Generally, less relays are required for EM communications. For example, there may be only a single relay. Optionally therefore, an EM relay (and the transceivers or transmitters associated with the apparatus or at the surface) may be configured to transmit for over 500 m, or over 1000 m.

The transmission may be more inhibited in some areas of the well, for example when transmitting across a packer. In this case, the relayed signal may travel a shorter distance. However, where a plurality of acoustic relays are provided, preferably at least three are operable to transmit a signal for at least 200 m through the well. For inductively coupled tubulars, a relay may also be provided, for example every 300-500 m in the well.

The relays may keep at least a proportion of the data for later retrieval in a suitable memory means.

Taking these factors into account, and also the nature of the well, the relays can therefore be spaced apart accordingly in the well.

The control signals may cause, in effect, immediate activation, or may be configured to activate the apparatus after a time delay, and/or if other conditions are present such as a particular pressure change.

Electronics

The apparatus may comprise at least one battery optionally a rechargeable battery. The battery may be at least one of a high temperature battery, a lithium battery, a lithium oxyhalide battery, a lithium thionyl chloride battery, a lithium sulphuryl chloride battery, a lithium carbon-monofluoride battery, a lithium manganese dioxide battery, a lithium ion battery, a lithium alloy battery, a sodium battery, and a sodium alloy battery. High temperature batteries are those operable above 85° C. and sometimes above 100° C. The battery system may include a first battery and further reserve batteries which are enabled after an extended time in the well. Reserve batteries may comprise a battery where the electrolyte is retained in a reservoir and is combined with the anode and/or cathode when a voltage or usage threshold on the active battery is reached.

The control mechanism is normally an electronic control mechanism. The communication device is normally an electronic communication device.

The apparatus, especially the control mechanism, preferably comprises a microprocessor. Electronics in the apparatus, to power various components such as the microprocessor, control and communication systems, and optionally the valve, are preferably low power electronics. Low power electronics can incorporate features such as low voltage microcontrollers, and the use of 'sleep' modes where the majority of the electronic systems are powered off and a low frequency oscillator, such as a 10-100 kHz, for example 32 kHz, oscillator used to maintain system timing and 'wake-up' functions. Synchronised short range wireless (for example EM in the VLF range) communication techniques can be used between different components of the system to minimize the time that individual components need to be kept 'awake', and hence maximise 'sleep' time and power saving.

The low power electronics facilitates long term use of various components of the apparatus. The control mechanism may be configured to be controllable by the wireless control signal up to more than 24 hours after being run into the well, optionally more than 7 days, more than 1 month, or more than 1 year or up to 5 years. It can be configured to remain dormant before and/or after being activated.

Sensors

The apparatus and/or the well (outwith and/or especially within the isolated section) may comprise at least one pressure sensor. The pressure sensor may be within the isolated section and may or may not form part of the apparatus. It can be coupled (physically or wirelessly) to a wireless transmitter and data can be transmitted from the wireless transmitter to outwith the isolated section or otherwise towards the surface. Data can be transmitted in at least one of the following forms: electromagnetic, acoustic and inductively coupled tubulars, especially acoustic and/or electromagnetic as described herein above.

Such short range wireless coupling may be facilitated by EM communication in the VLF range.

Optionally the apparatus comprises a volume indicator such as an empty/full indicator or a proportional indicator. A means to recover the data from the volume indicator is also normally included. The apparatus may comprise a pressure gauge, arranged to measure internal pressure in the container. The communication device may be configured to send signals from the pressure gauge optionally wirelessly.

Preferably at least temperature and pressure sensors are provided. The sensors may also sense the status of other parts of the apparatus or other equipment within the well, for example valve member position or motor rotation of the pump.

A density sensor may be provided, or alternatively two or more pressure sensors may be used to determine a pressure gradient at spaced apart points. This can be used in turn to ascertain or verify the density of the fluid which may be used to better infer pressure at other locations in the well or reservoir, which may not have a local pressure sensor.

An array of discrete temperature sensors or a distributed temperature sensor can be provided (for example run in) in the well. Optionally therefore it may be in or adjacent to the isolated section.

The array of discrete temperature sensors or a distributed temperature sensor can be provided on an outside of the casing system. Thus fluid movement outside of the casing system may be detected, which is indicative of failure of the isolated section, and could be dangerous if not detected and remedial action not taken.

Alternatively temperature sensors within the casing system may also be used to detect fluid movement outside of the casing system by measuring the effect of the external fluid movement on the internal temperature.

These temperature sensors may be contained in a small diameter (for example ¼") tubing line and may be connected to a transmitter or transceiver. If required any number of lines containing further arrays of temperature sensors can be provided. This array of temperature sensors may be configured to be spaced out so the array of temperature sensors contained within the tubing line may be aligned across the casing, for example near the casing hanger; either for example generally parallel to the well, or in a helix or ring shape, either external or internal to the casing.

The temperature sensors may be electronic sensors or may be a fibre optic cable.

Therefore in this situation the additional temperature sensor array could provide data from the isolated section and indicate if, for example, the casing system is leaking fluid. The array of temperature sensors in the tubing line can provide a clear indication of fluid flow, aiding in pinpointing the source(s) of the leak(s). Thus for example, more information can be gained on the location of the leak source.

Such temperature sensors may also be used before, during and after the pressure in the isolated section outside of the container is reduced.

Following operation of the device, data may be recovered from the pressure sensor(s), before, during and/or after reducing the pressure in the isolated section outside of the container. Recovering data means getting it to the surface.

The data recovered may be real-time/current data and/or historical data.

Data may be recovered by a variety of methods. For example it may be transmitted wirelessly in real time or at a later time, optionally in response to an instruction to transmit. Or the data may retrieved by a probe run into the well on wireline/coiled tubing or a tractor; the probe can optionally couple with the memory device physically or wirelessly.

Memory

The apparatus especially the sensors, may comprise a memory device which can store data for recovery at a later time. The memory device may also, in certain circumstances, be retrieved and data recovered after retrieval.

The memory device may be configured to store information for at least one minute, optionally at least one hour, more optionally at least one week, preferably at least one month, more preferably at least one year or more than five years.

The memory device may be part of sensor(s). Where separate, the memory device and sensors may be connected together by any suitable means, optionally wirelessly or physically coupled together by a wire. Inductive coupling is also an option. Short range wireless coupling may be facilitated by EM communication in the VLF range.

Dump Chamber Option

The container may include two sections referred to as a dump chamber and a fluid chamber. For such embodiments, the dump chamber is normally the portion of the inside of the container having a pressure less than the outside of the container.

The valve member may comprise a floating piston normally in the fluid chamber where the container has such a chamber. Normally the floating piston has a dynamic seal against an inside of the container. The floating piston may separate two sections of the fluid chamber, one in fluid communication with the port and another on an opposite side of the floating piston, in fluid communication with the dump container. The port may provide a cross-sectional area for fluid communication of at least 0.1 cm$^2$, normally at least 0.25 cm$^2$, optionally at least 1 cm$^2$. The cross-sectional area may be at most 150 cm$^2$ or at most 25 cm$^2$, or at most 5 cm$^2$, optionally at most 2 cm$^2$. Thus one side of the floating piston may be exposed to the well pressure via the port. Before effectively opening the port by moving the floating piston, a restraining mechanism is provided. Oftentimes, this includes a fluid, such as oil, in the fluid chamber on the dump chamber side of the floating piston. A control valve, choke and/or pump is normally provided to control fluid communication between the fluid chamber and the dump chamber. Alternatively the restraining mechanism may be a latching mechanism to hold the floating piston in position against the force of the well pressure, until it is activated to move.

Thus in response to the control signal the control mechanism can control the restraining mechanism and the floating piston moves which effectively opens the port to allow pressure and fluid communication between the container (well chamber section) and the well, to draw fluids therein.

In one embodiment therefore, when instructed the restraining mechanism between the fluid chamber and the dump chamber may allow fluid flow from the fluid chamber into the dump chamber driven by the action of the well pressure on the floating piston, thus allowing well fluids into the fluid chamber. For certain embodiments, a choke may be provided between the fluid chamber and the dump chamber to regulate movement of the floating piston which controls the ingress of fluids into the fluid chamber from the well.

A non-return valve may be provided in the port.

The dump chamber may have at least 90% of the volume of that of the fluid chamber but preferably the dump chamber has a volume greater than the volume of the fluid chamber to avoid or mitigate pressure build-up within the dump chamber and hence achieve a more uniform flow rate into the fluid chamber. The dump chamber may consist of gas, optionally at approximately atmospheric pressure, or may be partially evacuated.

Miscellaneous

The well may be a subsea well. Wireless communications can be particularly useful in subsea wells because running cables in subsea wells is more difficult compared to land wells. The well may be a deviated or horizontal well, and embodiments of the present invention can be particularly suitable for such wells since they can avoid running wireline, cables or coiled tubing which may be difficult or not possible for such wells.

The isolated section is an isolated section of the well system. References herein to "isolated section" is a section which is sealed at an upper and lower extent. It includes those where there are leaks found therein.

A well extends up to the top of the uppermost casing of the well. A well system extends further, including a BOP, Lower Marine Riser Package (LMRP) or wellhead, where present.

For certain embodiments, this method is combined with an underwater acoustic modem on the seabed for communication to a surface facility.

The volume of the container is its fluid capacity.

Transceivers, which have transmitting functionality and receiving functionality; may be used in place of the transmitters and receivers described herein.

All pressures herein are absolute pressures unless stated otherwise.

The well is often an at least partially vertical well. Nevertheless, it can be a deviated or horizontal well. References such as "above" and below" when applied to deviated or horizontal wells should be construed as their equivalent in wells with some vertical orientation. For example, "above" is closer to the surface of the well through the well.

References herein to cement include cement substitute. A solidifying cement substitute may include epoxies and resins, or a non-solidifying cement substitute such as Sandaband™.

Embodiments of the invention will now be described by way of example only and with reference to the accompanying drawings, in which.

Figure 1:
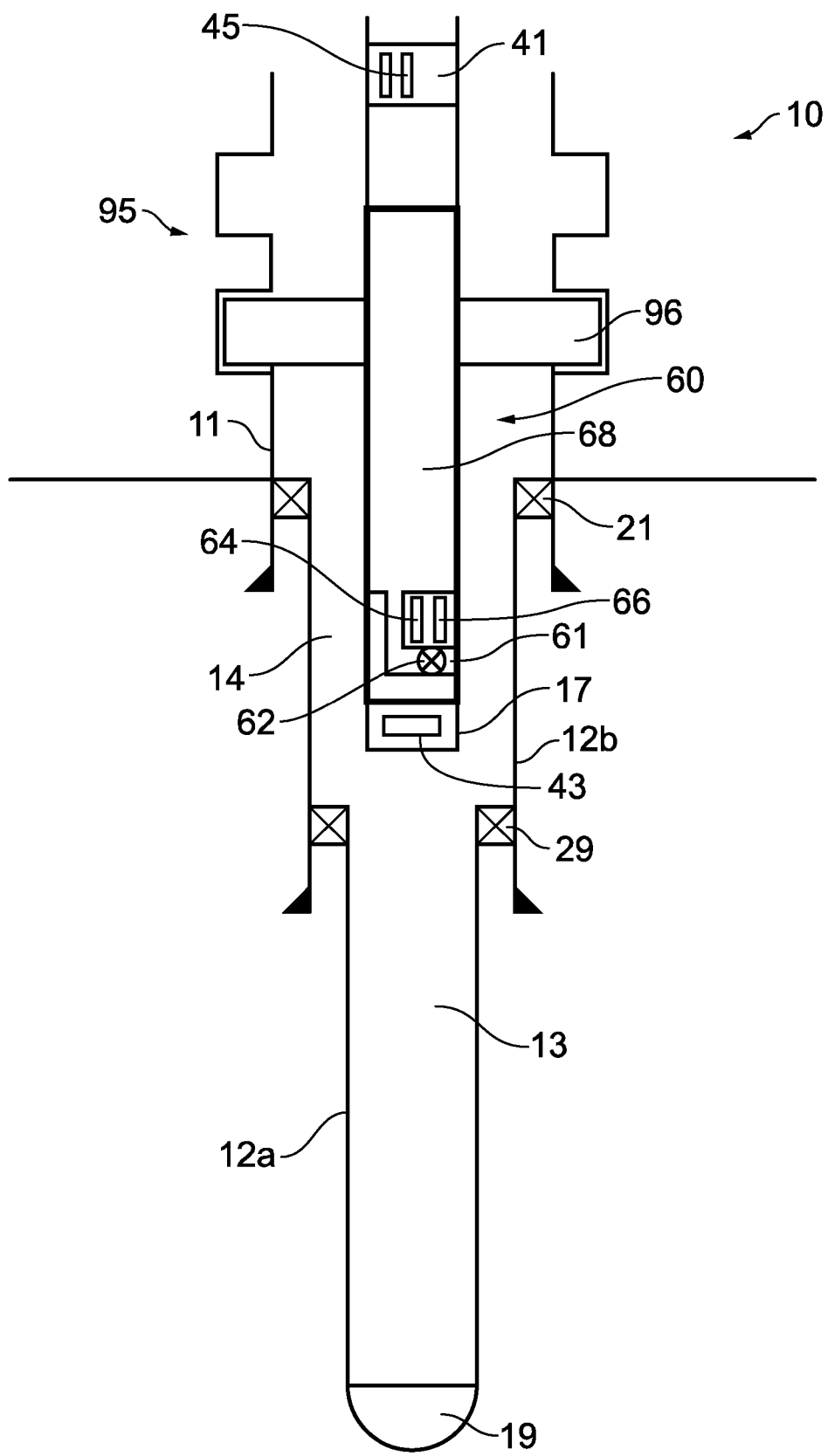
FIG. 1 is a schematic view of a well illustrating a method in accordance with an embodiment of the present invention.

FIG. 1 (not to scale) shows a subsea well system 14 with well apparatus 10 including a blowout preventer (BOP) 95 located at the top of an isolated section 13 of the well system 14, and an apparatus 60 in the form of a pipe 17. The apparatus 60 comprises a container 68, with a volume capacity of 3000 litres made up of 300 m of 5.5″ drill pipe, and a port 61 to selectively allow fluid communication between the container 68 and an outside thereof, i.e. a surrounding portion of the isolated section 13, depending on the position of a valve member (not shown in FIG. 1) of a valve 62. In use, the container 68 has an underbalance of pressure therein. As described below, the apparatus 60 can create an underbalance of pressure in the surrounding portion of the isolated section 13 in order to assess the integrity of the casing 12b and liner 12a including the casing hanger 21 and the liner hanger 29 by way of a negative pressure test.

The valve 62 (or other control device) is configured to isolate the port 61 to seal the container 68 from the surrounding portion of the isolated section 13 in a closed position, and allow fluid communication between the container 68 and the surrounding portion of the isolated section 13 via the port 61 in an open position. The valve 62 is controlled by a control mechanism comprising a valve (or pump) controller 66, and a transceiver 64 configured to receive a wireless control signal. In use, the valve 62 is moved from the closed position to the open position in response to the control signal.

The components of the control mechanism (the transceiver 64 and the controller 66 which controls the valve 62) are normally provided adjacent each other, or close together as shown; but may be spaced apart.

The illustrated well system 14 is a substantially vertical well comprising BOP body 11 and liner/casing strings 12a & 12b.

Inside each of the liner/casing strings 12a & 12b there is a wellbore 13. The well system 14 includes the casing hanger 21 and liner hanger 29. The casing and liner hangers 21, 29 are part of hanger assemblies from which the liner/casing strings 12a & 12b are hung.

The isolated section 13 is defined in the casing between BOP rams 96, with the apparatus 60 therebetween, and a casing shoe 19. It is not connected to the reservoir (unless there are unintended leaks) and is in such a state before any perforations or other communication paths are deliberately formed between the well system 14 and the surrounding earth formation/reservoir, for example, shortly after deploying and cementing in the lowermost casing, such as liner 12a.

A pressure (and preferably temperature sensor) 43 is provided on the apparatus 60 within the isolated section 13 which can pass data to a transceiver 64 for sending a wireless signal, e.g. an acoustic or electromagnetic signal, towards the surface of the well.

A relay 41 is provided on the pipe 17 above the BOP rams 96 which comprises a wireless transceiver 45. Thus data can be relayed from the transceiver 64 in the isolated section of the well 13 to the surface of the well, optionally via further relays. Similarly, control signals may be sent to the transceiver 64 and associated valve (or pump) controller 66, in the isolated section of the well 13, via the wireless relay 41. In use, the container 68 is air or nitrogen filled at atmospheric pressure, or optionally evacuated at the surface, then sealed by closing the valve 62, or a further valve near the top of the container (not shown), before the sealed container 68 is run into the well system 14. The well pressure from the hydrostatic head is sealed within the isolated section by closing the BOP rams 96 with the port 61 of the container 68 therebelow. The container 68 therefore has an underbalance of pressure, for example 1,000 psi (689.5 kPa), between the inside of the container 68 and outside of the container, i.e. the surrounding portion of the well 14 (which is at a higher pressure than atmospheric pressure on the surface due to the sealed-in hydrostatic pressure). The apparatus 60 is deployed so that the port 61 is below the BOP rams 96 and in the isolated section of the well 13. Indeed the apparatus 60, in part, isolates said section of the well 13 because it is situated within the BOP rams 96.

The BOP 95 comprises the pipe rams 96. The BOP rams 96 have an open and a closed position, the closed position being shown in FIG. 1. When in the closed position, the rams effectively seal the well system 14 and shut in the pressure caused by the hydrostatic head above the BOP rams 96, before they were closed. The BOP rams 96 define part of an isolated section of the well by sealing contact with the apparatus 60. The liner 12a has a liner or 'casing' shoe 19 which defines a lower part of the isolated section 13.

In the isolated section, the sequence begins with the valve 62 in the closed position. A wireless signal is then sent from a controller (not shown) to the valve (or pump) controller 66 via the transceiver 64 and the valve 62 opens to allow fluid communication with the surrounding portion of the isolated section 13. Once the valve 62 opens, fluid enters the container 68 which results in a reduction of the pressure in the surrounding portion of the isolated section 13.

The pressure sensor 43 monitors the pressure in the surrounding portion of the isolated section 13 before, during and after the valve 62 is opened, and transmits the data via the transceiver 64 to the surface where it can be analysed.

If no leaks are present in the surrounding portion of the isolated section 13, that is the integrity of, for example, the liner 12a, casing 12b, & the casing/liner hangers 21, 29 is intact, the pressure in the surrounding portion of the isolated section 13 will remain at substantially the same, reduced, pressure.

If, however one of the liner 12a, casing 12b and/or the casing/liner hangers 21, 29 or other parts (for example casing shoe 19) of the isolated section, have not sealed or have failed; well and/or reservoir fluids may be leaking into the isolated section 13, the pressure in the surrounding portion of the isolated section 13 will increase again, that is the pressure will recover at least to an extent.

The pressure sensor 43 will detect the pressure changes, or lack thereof, in the surrounding portion of the isolated section 13, and transmit this information to the surface via the transceiver 64. If a leak is detected, appropriate remedial action can be taken to contain the leak, and make the well safe, before opening the BOP rams 96.

The temperature can also be monitored as sometimes there are changes in temperature which can affect the pressure, even if the area being tested is properly sealed. For example, if following activation of the apparatus 60, the (liquid filled) isolated section 13 has a pressure of 200 bar at 30° C., the pressure will rise by ~8.5 bar for each 1° C. increase in temperature. Monitoring the temperature as well as pressure enables compensation to be made for changes due to temperature, and thus an assessment of the integrity of the liner 12a, casing 12b & the casing/liner hangers 21, 29 can be made before the temperature has stabilised. Moreover, reducing the volume under test, further assists in this by reducing any uncertainty in the temperature of the fluid and by accelerating any pressure increase due to a small leak into the closed system.

In alternative embodiments the container 68 may extend to the surface of the well system, and may be open-ended, or incorporate a further valve at surface to ensure control of the well. In this, and other embodiments, the test string and/or container may incorporate or be deployed along with heavy weight drill pipe or drill collars (not shown) to overcome the buoyancy associated with the container.

U.S.20130111985 the disclosure of which is incorporated herein by reference in its entirety, describes conducting positive and negative pressure tests more quickly by using distributed temperatures along the drill pipe to compensate for any thermally induced pressure changes.

Figure 2:
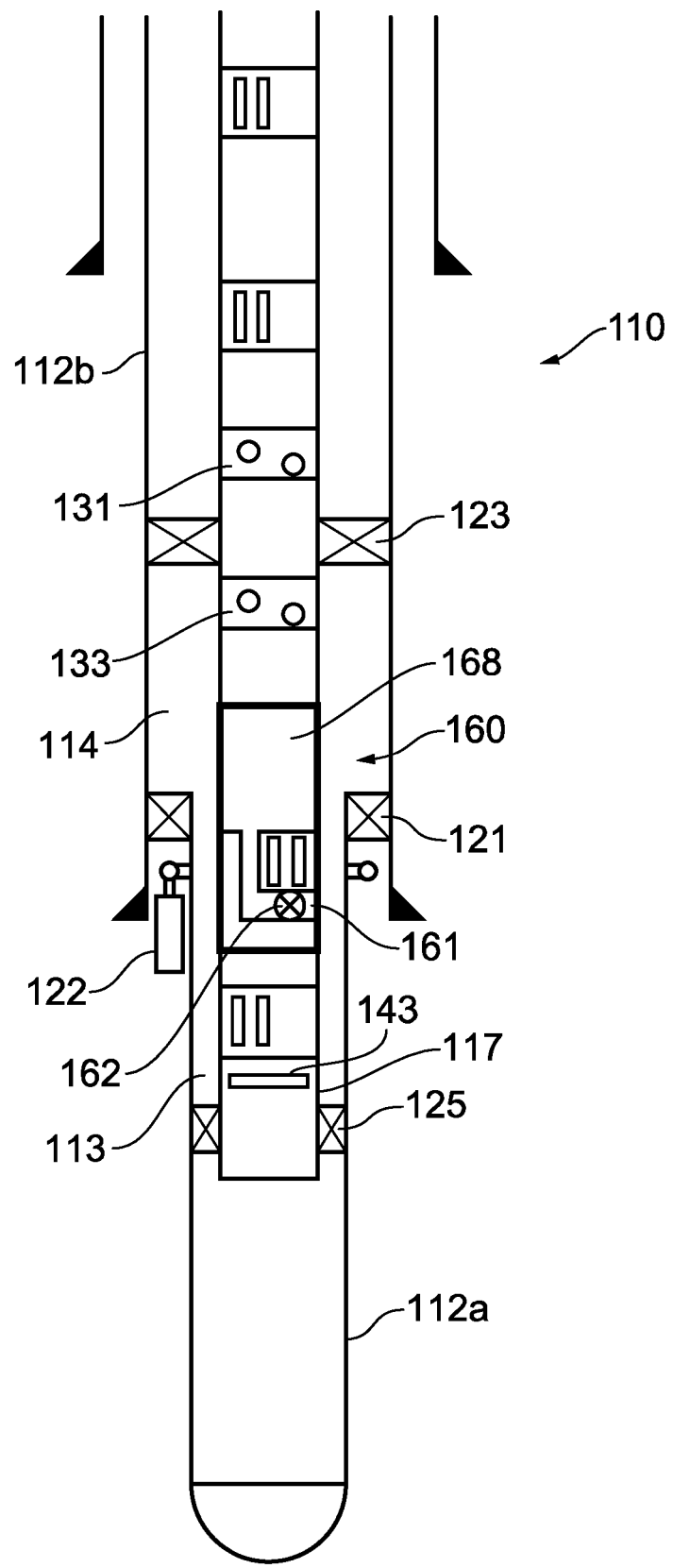
FIG. 2 is a schematic view of a well illustrating a second method in accordance with an embodiment of the present invention.

FIG. 2 (not to scale) shows a further embodiment which includes like parts with the FIG. 1 embodiment and these are not described again in detail. The reference numerals of the like parts share the same latter two digits in both embodiments, but differ in that they are prefixed with a '1' in this second embodiment.

FIG. 2 shows a well system 114 (which may or may not be subsea) with well apparatus 110 and an apparatus 160 in the form of a tubular 117. The apparatus 160 comprises a container 168, with a volume capacity of 100 litres, and a port 161 to selectively allow fluid communication between the container 168 and a surrounding portion of the isolated section, depending on the position of a valve member (not shown in FIG. 2) of a valve 162.

The apparatus 160 is part of a production tubular 117 and, in contrast to FIG. 1, in FIG. 2 is sealed within 9⅝" casing 112b by a packer 123. A temporary packer 125 seals the tubular 117 towards its lower extent against a liner 112a. The two packers 123, 125 thus isolate a section of the well 113 therebetween with the tubular 117, which conveyed the apparatus 160, also defining a part of the isolated section 113.

The isolated section of the well 113 includes a casing hanger 121, the integrity of which is tested using the apparatus 160 in the position shown in FIG. 2, following a procedure described above with respect to the FIG. 1 embodiment.

Thus in use, the container 168 has an underbalance of pressure therein. The apparatus 160 creates an underbalance of pressure in the isolated section 113 in order to assess the integrity of the casing hanger 121 and nearby casing by monitoring a pressure sensor 143 and optionally an array of discrete temperature sensors or a distributed temperature sensor 122 mounted outside the casing 112a adjacent the isolated section.

A pressure pulse controlled circulating valve 131 is provided above the packer 123 to provide means to circulate fluids in the tubing and annulus above packer 123. A further acoustically controllable circulating valve 133 is provided below the packer 123 to provide fluid communication means between the isolated section and the tubing, and hence with the surface.

Thus, in use, after completion of the pressure test, the circulating valve 133 may be used to equalize the pressure in the isolated section with the pressure in the tubing.

Furthermore, in use, in the event of a failure of the integrity of the casing hanger 121, the circulating valves 131 and 133 may be used to control the well. For instance, circulating valve 131 may be used to circulate cement into the tubing above valve 131, before closing valve 131 and opening vale 133 to permit bull-heading of the cement in to the isolated section to squeeze cement past the leaking casing hanger 121 to thus seal the leak.

After use, the packer 125 which defined the lower extent of the isolated section is disengaged and recovered with the tubular 117 and apparatus 160 to the surface. Packer 123 is also removed.

In a modified version of the FIG. 2 embodiment, in place of the circulating valve 133, a ported sub and a tubing valve, such as a ball valve, may be used. With the ported sub below the packer 123, such a valve may be positioned above or below the packer 123 and may be controlled by pressure pulses through the annulus.

Optionally the packer 125 may not be used and a larger volume chamber used to perform a negative pressure test of the entire liner 112a.

Figure 3:
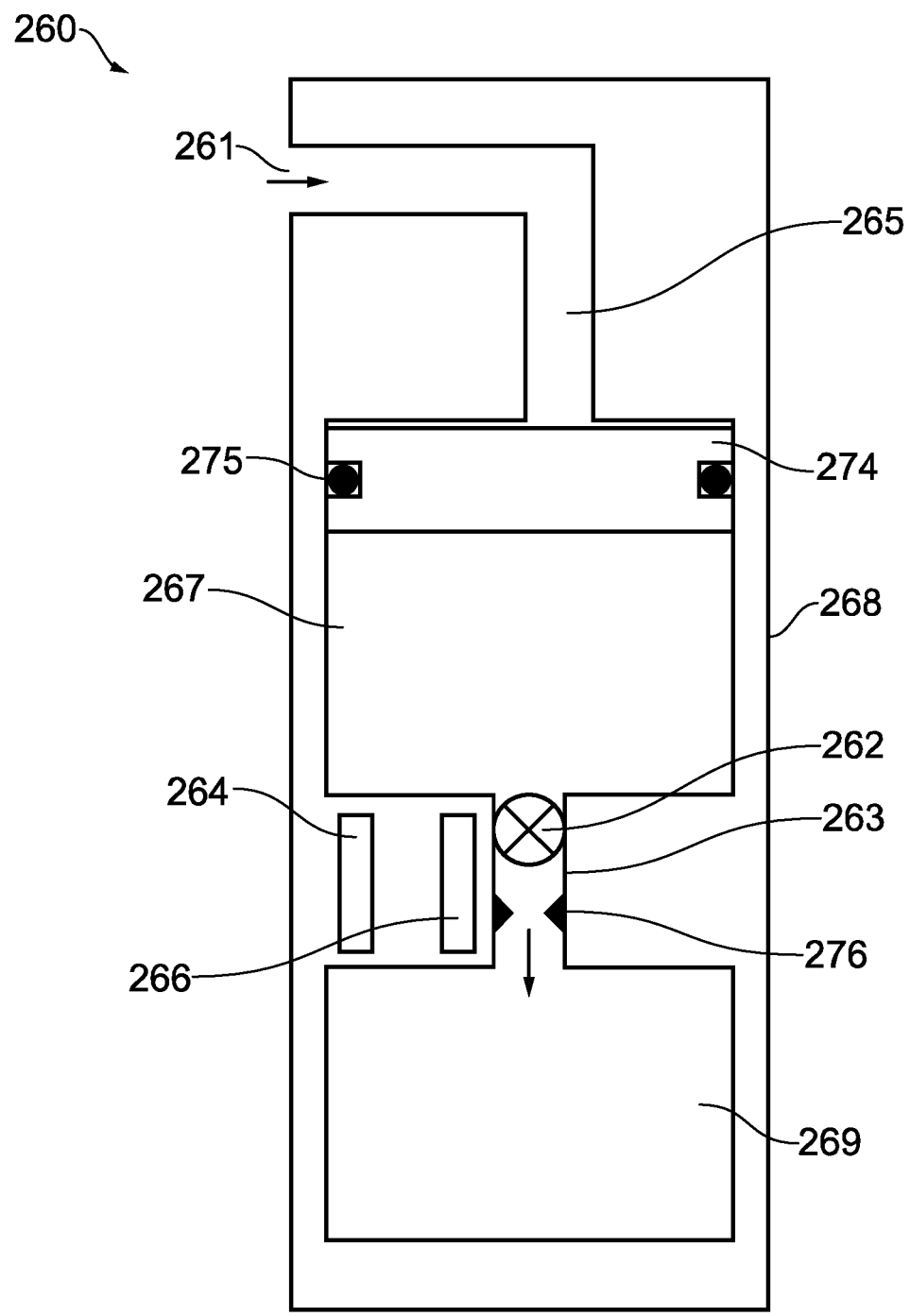
FIG. 3 is a sectional view of an apparatus used in accordance with the present invention comprising a floating piston and dump chamber.

A variety of apparatus can be used in accordance with the method of the present invention. A further embodiment of an apparatus 260 is shown in FIG. 3 wherein a control valve 262 and a choke 276 are located in a central portion of the apparatus in a port 263 between two sections of a container 268—a fluid chamber 267 and a dump chamber 269. A floating piston 274 is located in the container 268 above the valve 262. The fluid chamber 267 is initially filled with oil.

In the present embodiment the floating piston 274 functions as a valve to resist or allow fluid entry into the container. When the floating piston 274 is located at the top of the fluid chamber 267 it isolates/closes the fluid chamber 267 from the surrounding portion of the isolated section, and when the floating piston 274 is located at the bottom of the fluid chamber 267 the opening 261 allows fluid entry into the fluid chamber 267 and the surrounding portion of the isolated section via flow port 265. The location of the floating piston 274 is controlled indirectly by the flow of fluid through the control valve 262, which is in turn controlled via signals sent to a valve (or pump) controller 266.

In use, the sequence begins with the control valve 262 in the closed position and the floating piston 274 located towards the top of the fluid chamber 267. Due to an underbalance of pressure (for example 1000 psi), the fluid in the well attempts to enter the fluid chamber 267 via the opening 261 but is resisted by the floating piston 274 and oil therein whilst the control valve 262 is in the closed position. A signal is then sent to the valve (or pump) controller 266 instructing the control valve 262 to open. Once the control valve 262 opens, oil from the fluid chamber 267 is directed into the dump chamber 269 by the well pressure acting on the floating piston 274, and fluids from the well are drawn into the fluid chamber 267. The rate at which the oil in the fluid chamber 267 is expelled into the dump chamber 269, and consequentially the rate at which the fluids from the well can be drawn into the container 268, is controlled by the cross-sectional area of the choke 276. In alternative embodiments, the choke 276 and control valve 262 positions can be in the opposite order to that illustrated, or may be combined. Indeed the control valve 262 can be at the port 261, albeit it is preferred to have the choke 276 between the fluid chamber 267 and dump chamber 269. In this way, the choke 276 and oil regulates the flow of fluid into the fluid chamber 267 irrespective of the properties, such as the density or viscosity, of the well fluids.

Figure 4:
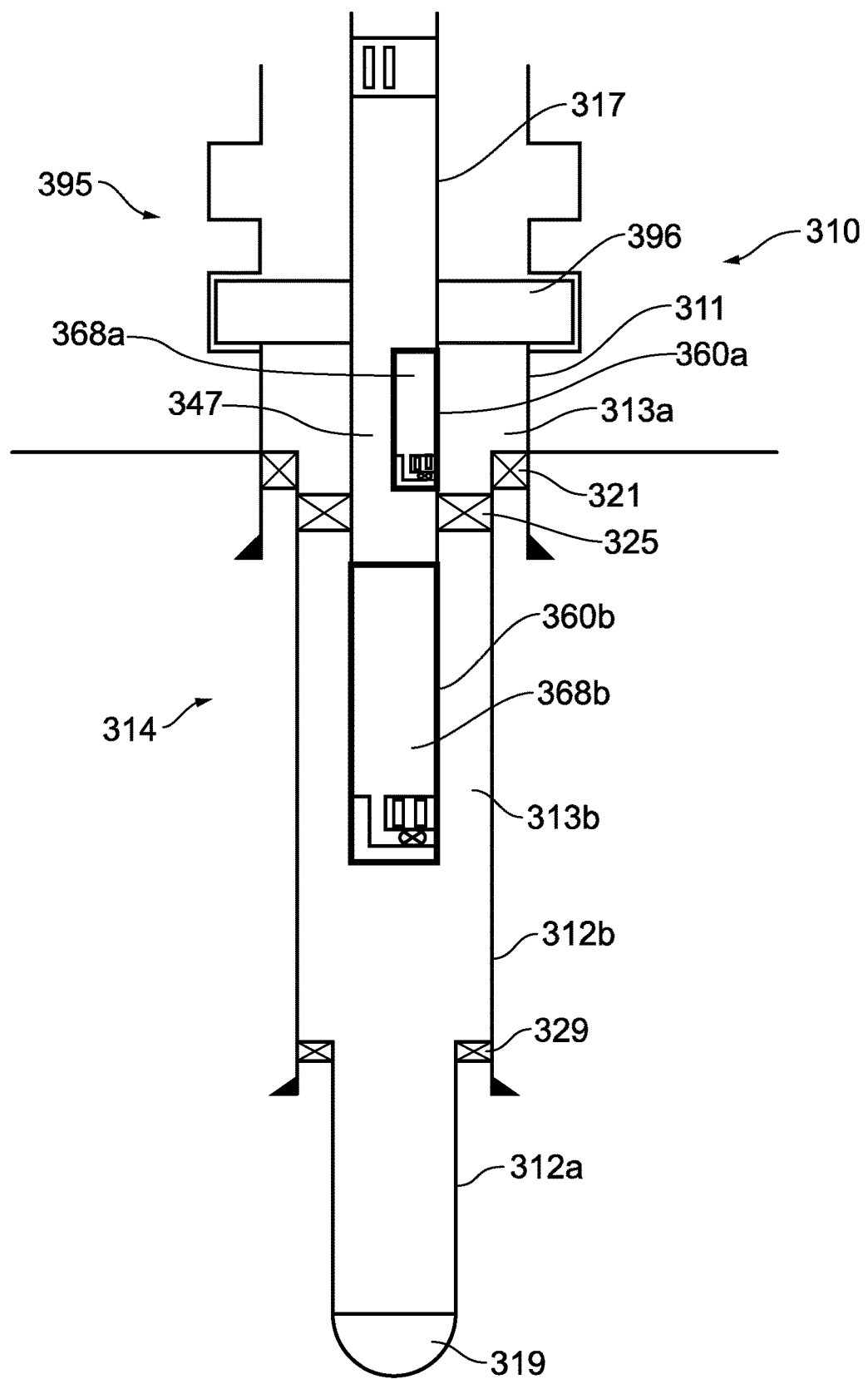
FIG. 4 is a schematic view of a well with two isolated sections, illustrating a method in accordance with an embodiment of the present invention.

FIG. 4 (not to scale) shows a subsea well system 314 with well apparatus 310 including a blowout preventer (BOP) 395 located at the top of a first of two isolated sections 313a, 313b of the well system 314, and two apparatus 360a, 360b connected to a pipe 317.

The well 314, well apparatus 310, and apparatus 360a, 360b include many like parts and functionality with the well 14, well apparatus 10, and apparatus 60 described in FIG. 1, which will not be repeated, but the parts are preceded by a '3'.

The apparatus 360a is provided in the isolated section 313a. The isolated section 313a is defined between BOP rams 396, a BOP body 311 and a temporary packer 325. The pipe 317 which conveyed the apparatus 360a, 360b into the well 314 also helps define the isolated section 313a by sealing within the BOP rams 396 and temporary packer 325.

The apparatus 360b is provided in the isolated section 313b. The isolated section 313b is defined by the temporary packer 325, liner 312a, casing 312b and a casing shoe 319. Likewise, the pipe 317 sealed within the temporary packer 325 helps define the isolated section 313b.

The apparatus 360a comprises a container 368a with a volume capacity of 20 litres. The apparatus 360b comprises a container 368b, with a volume capacity of 3000 litres made up of 300 m of 5.5" drill pipe. Notably, the apparatus 360a is sized in the pipe 317 such that there is an adjacent space 347 within the pipe 317 where fluid or indeed tools may pass. Other embodiments could be similarly sized.

The apparatus 360a and 360b operate as described for earlier embodiments. However in the present embodiment, both are deployed on the same pipe 317 and two separate tests can be conducted in the same run, focusing on the respective isolated sections 313a, 313b. Thus a casing hanger 321 can be tested in the first isolated section 313a and a liner hanger 329 (and liner/casing 312a, 312b) in the second isolated section 313b.

Figure 5:
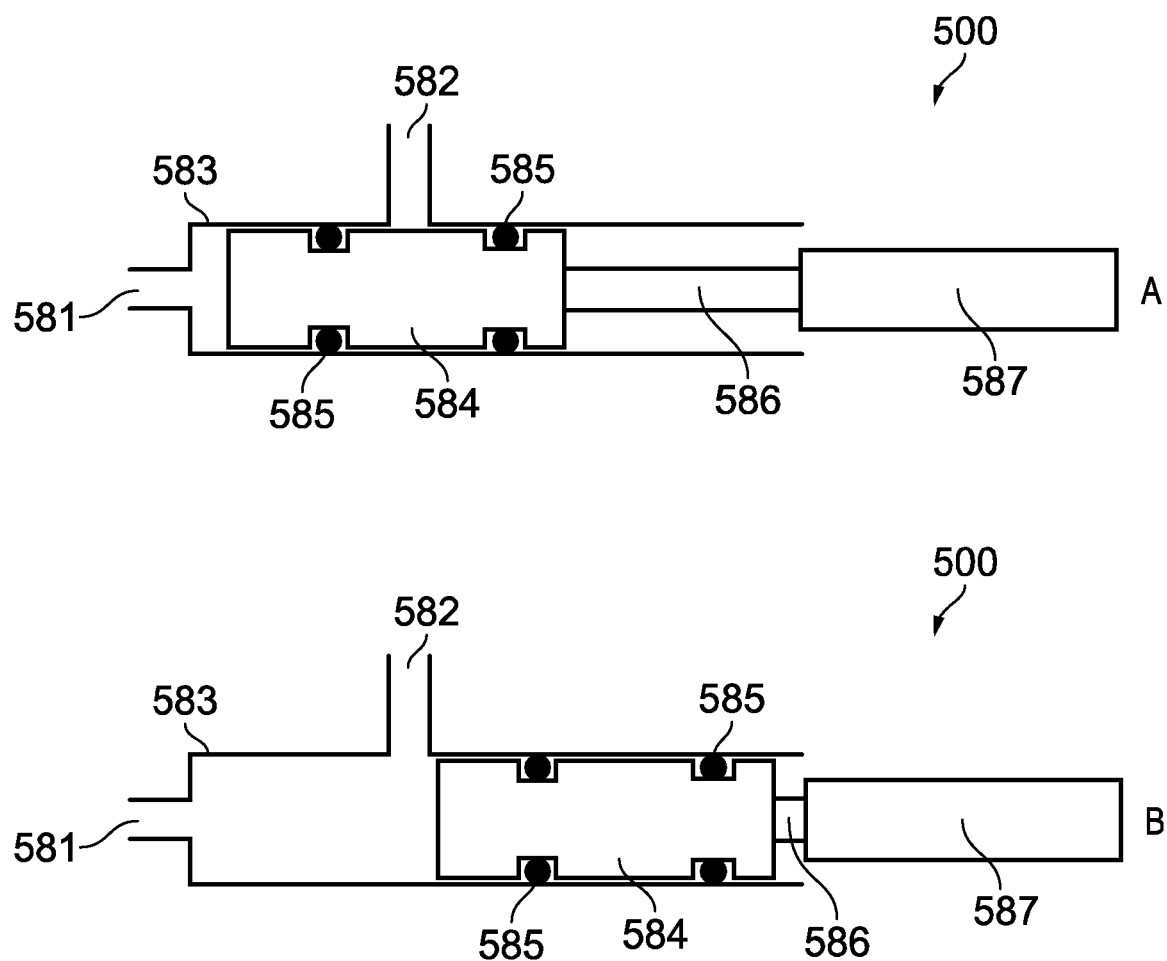
FIG. 5 is a front view of an embodiment of a valve assembly for use with the method in accordance with the present invention.

A variety of valves/control valves may be used with the apparatus described herein. FIG. 5 shows one example of a valve assembly 500 in a closed position A and in an open position B. The valve assembly 500 comprises a housing 583, a first inlet port 581, a second outlet port 582 and a valve member in the form of a piston 584. The valve assembly further comprises an actuator mechanism which comprises a lead screw 586 and a motor 587.

The first port 581 is on a first side of the housing 583 and the second port 582 is on a second side of the housing 583, such that the first port 581 is at 90 degrees to the second port 582.

The piston 584 is contained within the housing 583. Seals 585 are provided between the piston 584 and an inner wall of the housing 583 to isolate the first port 581 from the second port 582 when the valve assembly 500 is in the closed position A; and also to isolate the ports 581, 582 from the actuator mechanism 586, 587 when the valve assembly is in the closed A and/or open B position.

The piston 584 has a threaded bore on the side nearest the motor 587 which extends substantially into the piston 584, but does not extend all the way through the piston 584. The lead screw 586 is inserted into the threaded bore in the piston 584. The lead screw 586 extends partially into the piston 584 when the valve assembly 500 is in the closed position A. The lead screw 586 extends substantially into the piston 584 when the valve assembly is in the open position B.

In use, the valve assembly is initially in the closed position A. A side of the piston 584 is adjacent to the first port 581 and a top side of the piston 584 is adjacent to the second port 582 so that the first port 581 is isolated from the second port 582. This prevents fluid flow between the first port 581 and the second port 582. Once the actuator mechanism receives a signal instructing it to open the valve, the motor begins to turn the lead screw 586 which in turn moves the piston 584 towards the motor 587. As the piston 584 moves, the lead screw 586 is inserted further into the piston 584 until one side of the piston 584 is adjacent to the motor 587. In this position, the first port 581 and the second port 582 are open and fluid can flow in through the first port 581 and out through the second port 582.

Modifications and improvements can be incorporated without departing from the scope of the invention.

The invention claimed is:

1. A method of pressure testing a casing system of a well system, the method comprising:
    providing an apparatus comprising a communication device, and a container with a volume of at least twenty litres (l), the container having a port to allow for fluid communication between an inside and an outside of the container;
    closing the port such that the inside of the container has a container pressure;
    deploying the apparatus into the well system on one of production tubing and drill pipe, said one of production tubing and drill pipe comprising joints of 3 m to 14 m, and nominal external diameter from 2⅞" (73 mm) diameter and at most 7" diameter (178 mm);
    isolating a section of the well system to provide an isolated section, the isolated section including the port of the container; the isolated section, outside of the container, having an isolated section pressure which is higher than the container pressure;
    reducing the pressure in the isolated section outside of the container, by opening the port to allow fluid communication between the inside of the container and an outside of the container; and,
    whilst maintaining isolation of the isolated section, monitor the pressure in the isolated section;
    using the monitored pressure to assess the integrity of the isolated section;
    communicating between the communication device in the isolated section and above the isolated section by using, at least in part, a wireless signal transmitted in at least one of the following forms: electromagnetic, acoustic, inductively coupled tubulars and coded pressure pulsing;
    wherein the wireless signal comprises at least one of (i) pressure data and (ii) control signals for controlling fluid flow through the port.

2. A method as claimed in claim 1, wherein the isolated section includes a casing hanger.

3. A method as claimed in claim 1, wherein the pressure in the isolated section is monitored by a pressure sensor therein.

4. A method as claimed in claim 1, wherein temperature in the isolated section is monitored by a temperature sensor and optionally taken into account when assessing the integrity of the isolated section.

5. A method as claimed in claim 1, wherein the container is formed from at least one of drill pipe and production tubing.

6. A method as claimed in claim 1, wherein a valve is provided in one of the drill pipe and the production tubing used to deploy the apparatus, the valve between a central bore therein and the isolated section, to one of allow and resist fluid passage therebetween.

7. A method as claimed in claim 1, wherein a valve is provided in one of the drill pipe and the production tubing used to deploy the apparatus, the valve between a central bore therein and an annulus above the isolated section, to one of allow and resist fluid passage therebetween.

8. A method as claimed in claim 1, wherein the container volume is from 0.05-10 vol % of the volume of the isolated section, optionally 0.2-3 vol % of the volume of the isolated section.

9. A method as claimed in claim 1, wherein the container is sealed at surface prior to deployment into the well.

10. A method as claimed in claim 1, wherein a drawdown caused by allowing the container to communicate with said outside of the container is one of at least 250 psi, and more than 500 psi and more than 1000 psi.

11. A method as claimed in claim 1, wherein one of: (i) an array of discrete temperature sensors, and (ii) a distributed temperature sensor, is provided adjacent and/or within the isolated section.

12. A method as claimed in claim 11, wherein the one of (i) the array of discrete temperature sensors and (ii) the distributed temperature sensor is provided outside of the casing system.

13. A method as claimed in claim 1, wherein the isolated section at its upper extent is defined, at least in part, by one of rams of a blow-out preventer, lines connected to a blow-out-preventer, valves of a lower marine riser package, a wellhead up to a barrier, an annular sealing device, a diverter, a valve and a blank.

14. A method as claimed in claim 1, wherein the isolated section, at its lower extent is defined, at least in part, by a casing shoe, a valve, a blank and an annular sealing device.

15. A method as claimed in claim 14, wherein the isolated section at its lower extent is defined by an annular sealing device and after the port is opened, the method includes moving the apparatus towards the surface of the well for recovery along with said annular sealing device which previously defined the isolated section's lower extent.

16. A method as claimed in claim 1, wherein the wireless signal comprises control signals for controlling fluid flow through the port.

17. A method as claimed in claim 1, wherein the wireless signal comprises pressure data from a sensor in the isolated section.

18. A method as claimed in claim 1, wherein a second smaller isolated section is isolated, and a second container is provided, and the following steps are conducted:
   reduce the pressure in the second isolated section outside of the second container, by allowing fluid communication between the inside of the second container and the outside of the second container; and,
   whilst maintaining isolation of the second isolated section, monitor the pressure in the second isolated section; using the monitored pressure to assess the integrity of the second isolated section.

19. A method as claimed in claim 1, wherein the wireless signal is transmitted as at least one of electromagnetic signals and acoustic control signals.

20. A method as claimed in claim 1, wherein the one of the production tubing and the drill pipe defines, in part, the isolated section.

21. A method as claimed in claim 1, wherein the one of the production tubing and the drill pipe and apparatus is configured such that in use, an adjacent flowpath is provided past the apparatus within the one of the production tubing and the drill pipe.

* * * * *